(12) United States Patent
Kuhn et al.

(10) Patent No.: US 6,459,975 B1
(45) Date of Patent: Oct. 1, 2002

(54) METHOD FOR RECOGNIZING THE SEVERITY OF A VEHICLE COLLISION

(75) Inventors: Andreas Kuhn; Jan Urbahn, both of Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 09/909,848

(22) Filed: Jul. 23, 2001

(30) Foreign Application Priority Data

Jul. 21, 2000 (DE) .......................... 100 35 505

(51) Int. Cl.$^7$ ................................. G06E 7/00
(52) U.S. Cl. ................ 701/45; 701/68; 108/268; 108/211; 280/735
(58) Field of Search .................. 701/45, 46, 47, 701/68; 180/268, 271, 282; 280/734, 735

(56) References Cited

U.S. PATENT DOCUMENTS

| 5,377,108 | A | | 12/1994 | Nishio | 701/45 |
|---|---|---|---|---|---|
| 5,684,701 | A | | 11/1997 | Breed | 701/45 |
| 6,047,985 | A | * | 4/2000 | Yoshida | 280/735 |
| 6,216,070 | B1 | * | 4/2001 | Hayashi et al. | 701/45 |
| 6,219,606 | B1 | * | 4/2001 | Wessels et al. | 701/45 |
| 6,300,866 | B1 | * | 10/2001 | Foith et al. | 340/436 |

FOREIGN PATENT DOCUMENTS

DE 198 54 380 A1 5/2000

* cited by examiner

*Primary Examiner*—Gertrude Arthur
(74) *Attorney, Agent, or Firm*—Crowell & Moring LLP

(57) ABSTRACT

In a method for recognizing the severity of a vehicle collision, wherein the output signal of one or more acceleration sensors is processed and fed to a neural network that controls a release unit for an occupant protection device, and further wherein several occupant protection devices can be selected by the release unit in accordance with the severity and course of the vehicle collision, the future time progression of the output signal of the acceleration sensor is predicted with the help of the neural network based on the acceleration sensor signal values during at least one defined point in time.

4 Claims, 2 Drawing Sheets

METHOD FOR RECOGNIZING THE SEVERITY OF A VEHICLE COLLISION

BACKGROUND AND SUMMARY OF THE INVENTION

This application claims the priority of German Application No. 100 35 505.6, filed Jul. 21, 2000, the disclosure of which is expressly incorporated by reference herein.

The invention relates to a method for recognizing the severity of a vehicle collision, where the output signal of one or more acceleration sensors is processed and fed to a neural network that controls a release unit for an occupant protection device. Several occupant protection devices can be selected by the release unit in accordance with the severity and course of the vehicle collision.

Such a method is known as disclosed in German Patent document DE 198 54 380 A. There, an output signal of several acceleration sensors is processed and entered into the neural network in order to obtain a statement about the severity of a vehicle collision.

The invention is based on the problem of trying to create a method of the above-described kind that offers a fast and meaningful opportunity for predicting the severity of a vehicle collision.

The invention solves this problem by providing a method for recognizing the severity of a vehicle collision, where the output signal of one or more acceleration sensors is processed and fed to a neural network that controls a release unit for an occupant protection device. Several occupant protection devices can be selected by the release unit in accordance with the severity and course of the vehicle collision. The future time progression of the output signal of the acceleration sensor is predicted with the help of the neural network based on the acceleration sensor signal values during at least one defined point in time.

Input variables into the neural network are the processed signals of preferably several acceleration sensors that are distributed throughout the vehicle. Processing means looking at simple or multiple integrated or otherwise filtered sensor signals and using either the time series as such as input variables or determining special, characteristic values from the signal progression line and feeding them as input to the neural network. These characteristic variables can include: values of the processed signals at certain defined times with regard to the time of the evaluation, signal values at special trigger times, achieved maximum values, time periods for certain signal increases, increases in the signal progression line, arithmetic combinations of various processed signals, or the like.

The output variable of the neural network is a statement about the crash severity and thus about the expected driver and passenger impact. This statement can be particularly close to reality due to the statement of the future course of the acceleration signal value(s) obtained through the neural network. By contrast, the statement about the crash severity is usually directly connected with the actuator system on existing air bag trigger algorithms. With the increasing number of restraint systems, a formulation of the crash severity would become increasingly complicated. The present invention provides a parametric definition of a crash severity that is independent from the respective actuator system that is employed.

The crash severity in the case of a head-on collision is therefore defined by the expected course of the acceleration sensor signal. This progression line is identical to the expected acceleration of the occupant compartment.

With the help of the neural network, the subsequent time line of the signal is calculated. The result of this calculation is a statement about the expected forward movement of the unrestrained occupant. This results in statements such as, for example: without restraint the occupant would bounce against the steering wheel at approximately 10 m/s in 50 ms (corresponds to a forward movement of about 300 mm).

This statement is then counteracted by an appropriate action of the occupant protection and restraint devices, which are controlled by the releasing unit.

Consideration of the free movement of the vehicle occupant in connection with the selection of occupant protection and restraint devices is basically known from French Patent document FR 21 84 307 and European Patent document EP 327 853 B. An air bag system is released when the expected forward movement of the vehicle occupant exceeds a certain threshold value (FR 21 84 307) or when this threshold value is exceeded at two subsequent time intervals (EP 327 853 B). In neither case, the future acceleration behavior of the vehicle occupant is deduced, only a distinction is made between "FIRE/NO-FIRE." By contrast, in the case of the present invention, a statement is obtained with the help of the neural network about the expected impact of the vehicle occupant, and from this the possibility is deduced how this impact can be counteracted by an appropriate release strategy of the occupant protection and restraint devices in a specific manner.

The processing in accordance with the invention of the acceleration signals with the help of the neural network and the prediction of the expected impact offers a generalized statement (hereinafter called crash severity parameter (CSP) because in this statement about the crash severity neither vehicle type and equipment nor load drop/barrier are considered. Although the occurring values of the CSP are dependent upon the vehicle structure, the effect on the vehicle occupant always only depends on the CSP value itself.

The CSP now is directly related to the occupant impact. A deduction from the crash position/speed/barrier stiffness or similar on the occupant impact is no longer required.

With the CSP that is determined in accordance with the invention, it is also possible to differentiate between accident situations where different release strategies of the occupant protection and restraint devices are supposed to occur with sufficient exactness. The CSP is therefore not dependent upon the occupant restraint devices. This makes it possible to adjust it optimally in its effectiveness.

Other objects, advantages and novel features of the present invention will become apparent from the following detailed description of the invention when considered in conjunction with the accompanying drawings.

DETAILED DESCRIPTION OF THE DRAWINGS

Figure 1:
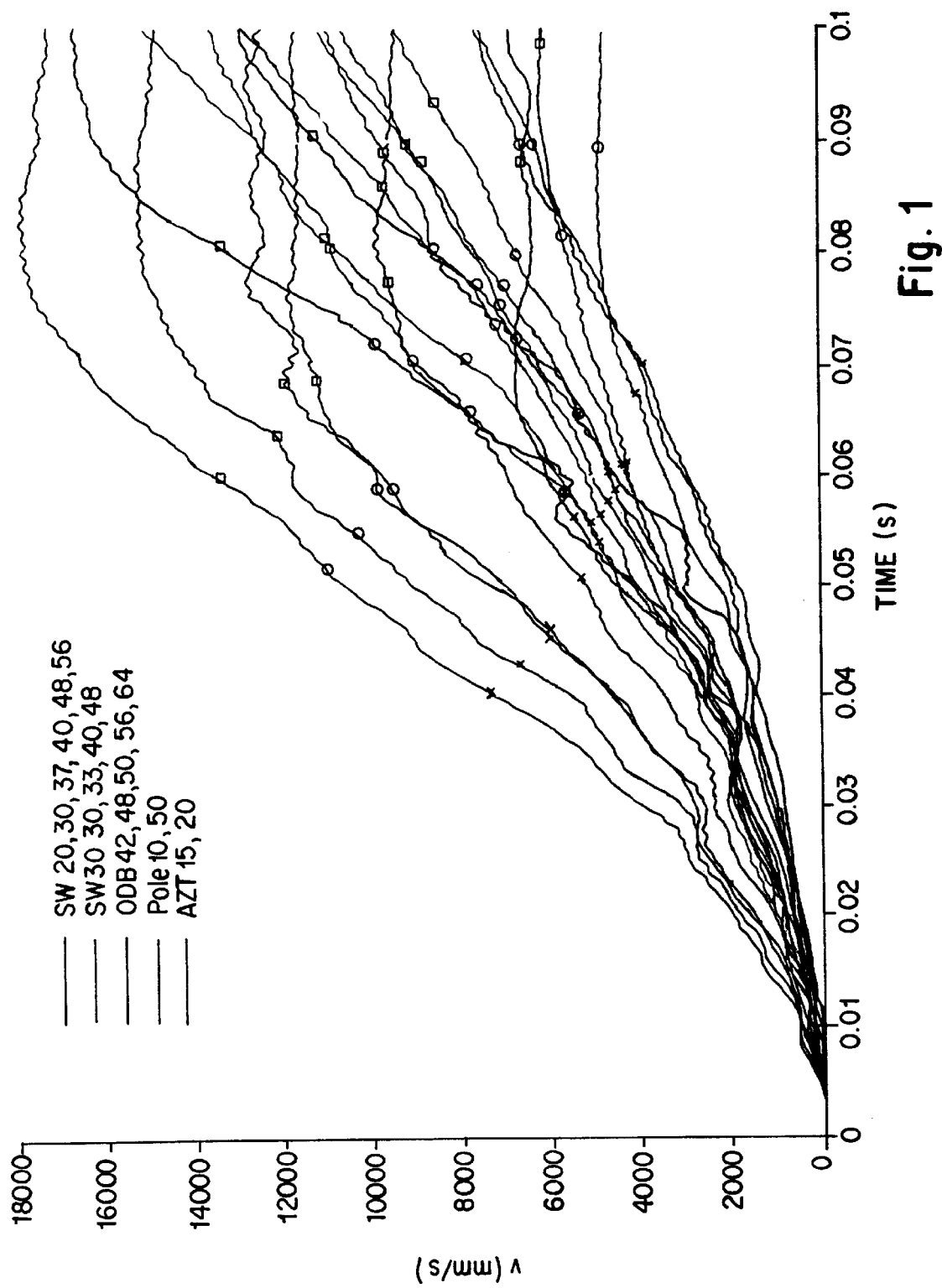
FIG. 1 is a graph depicting the forward movement speed of a vehicle over time with respect to different impact barriers.

As shown in FIG. 1, the CSP is an expected time progression line. This curve must be described sufficiently with the lowest possible number of parameters. The actual occupant forward movement is represented by the forward movement path over time s=s(t). It can also be shown by the speed progression v=v(t)=s' (t) or the acceleration progression a=a(t)=v' (t)=s" (t).

FIG. 1 depicts the forward movement speed of a vehicle (not shown) traveling at different speeds of 20 and 40 km/h impacting against:

a rigid wall with 100% cover (lines 1a/1b), a deformed barrier with 40% cover (2a/2b), an inclined wall (3a/3b), a center pole (4a/4b), and a rigid wall with 40% cover (5a/5b).

A cross, circle and square mark the time at which 100, 200 and 300 mm of forward movement occur, respectively.

In order to characterize the forward movement in the implemented algorithm, different possibilities are available to lead to the same goal.

A. Global Evaluation Variable and Reference to a Reference Time

The entire forward movement progression is described based on characteristic variables. An example would be the average acceleration occurring between 100 and 300 mm of occupant forward movement.

When $$t1=t(s=100 \text{ mm}) \quad v1=v(t1) \quad (1)$$

$$t3=t(s=300 \text{ mm}) \quad v3=v(t3) \quad (2)$$

then the quotient corresponds to $$am = \frac{v3 - v1}{t3 - t1} = \frac{dv}{dt} \quad (3)$$

of this average acceleration, which roughly correlates to the EES (Energy Equivalent Speed) 1 and thus offers a conclusion about the occupant restraint systems that need to be activated. When this parameter is detected at the time t with sufficient certainty, one knows which restraint systems need to be activated. It must be additionally specified when they need to be activated, e.g. with a time reference $$\text{dtFIRE} = t1 - 30 \text{ ms} - t \quad (4)$$

The crash severity, which is used for a release decision and is an output variable from the neural network, would then be the set of parameters (am, dtFIRE).

B. Local Variables with Fixed Time Reference to the Evaluation Time

In contrast to the procedure described in section A above, here, no global variable concerning the expected occupant forward movement is evaluated, but instead only a preview over a defined period of time in reference to the evaluation time t.

The evaluation of the neural network at the time t during the accident provides then, e.g., an estimated value for the average expected occupant acceleration and/or forward movement at the time t+30 ms, t+40 ms, etc. How detailed and exact this statement must be depends on the actuators that are employed.

Figure 2:
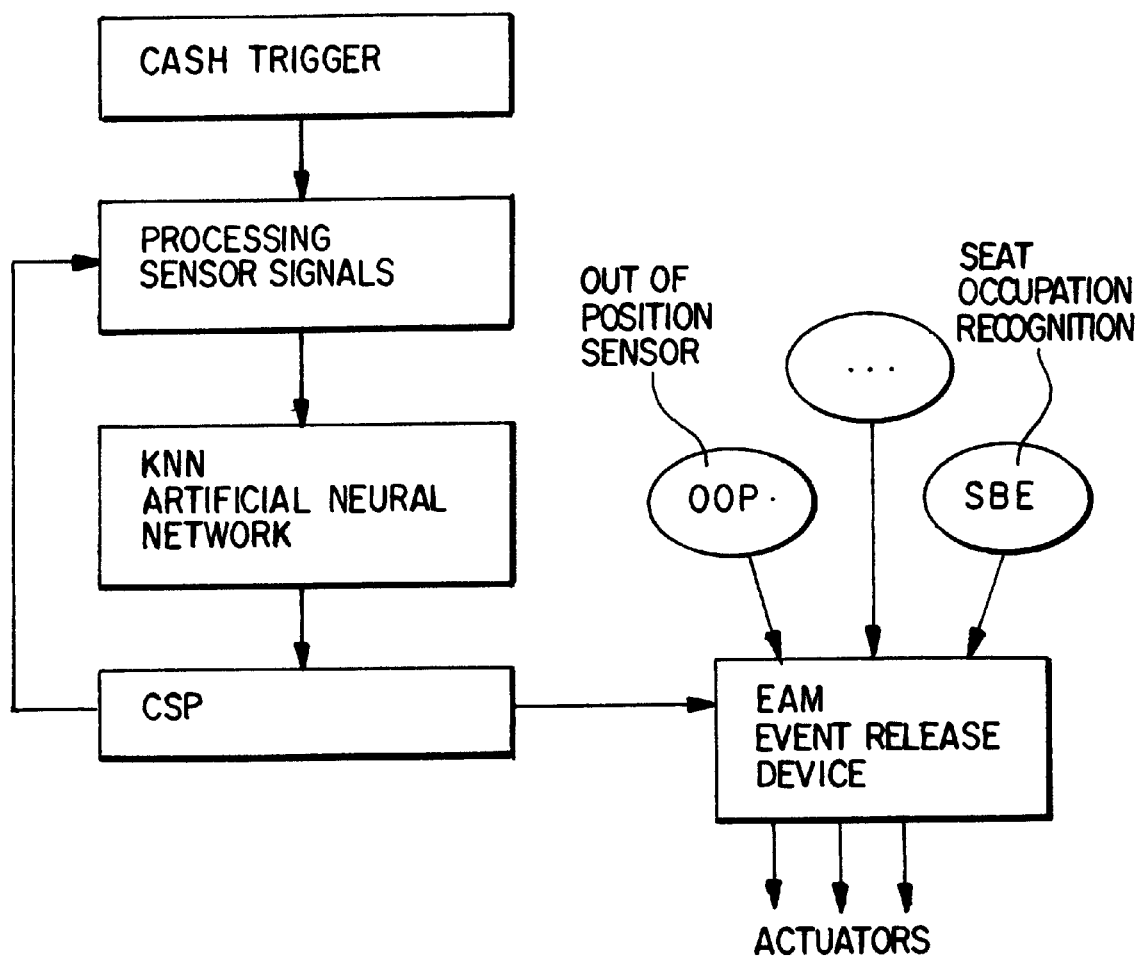
FIG. 2 is a flow chart illustrating an air bag release algorithm in accordance with the present invention.

An air bag release algorithm would therefore have the following structure, which is shown in FIG. 2:

The processed sensor signals (possibly not until reaching a crash trigger, i.e. when exceeding the acceleration signal threshold value) are fed to a neural network, which issues the described parameters for characterization of the crash severity. They can be the values of the acceleration sensors at a certain time (exceeding the threshold value). Alternatively, the signal values can be recorded constantly and, preferably, at regular intervals of e.g. 0.25 msec, and the 2,3, . . . signal values preceding this time can be evaluated when exceeding the crash trigger. This way, the signal history preceding the crash trigger is being evaluated. With the help of the neural network (KNN), the future course of the signal can be predicted from the history.

The information gained in this manner about the future acceleration signal value progression is then coupled with information from other systems, such as seat occupant recognition (SBE), out-of-position sensors (OOP) pre-crash sensors, etc., to inform a release decision. This occurs in a so-called event release matrix, which may possibly again have the design of a neural network, fuzzy logic circuit or the like.

The CSP is the interface between the sensors and actuators. Since the CSP offers the presented advantages, the sensors and actuators can have a separate design. This results overall in a method that makes it possible with little effort to quickly and safely provide statements about the severity and course of a vehicle collision, so as to trigger occupant protection devices as needed.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for recognizing the severity of a vehicle collision, the method comprising the acts of:

processing an output signal of at least one acceleration sensor on a vehicle;

feeding the output signal to a neural network that controls a release unit for an occupant protection device of the vehicle, wherein a future time progression of the output signal of the at least one acceleration sensor is predicted using the neural network based on acceleration sensor signal values during at least one defined point-in-time; and selecting the occupant protection device in accordance with the severity and course of the vehicle collision based on the predicted future time progression of the output signal of the acceleration sensor.

2. The method according to claim 1, wherein the feeding of the processed output signal of the at least one acceleration sensor to the neural network occurs at a time at which a threshold value of the output signal is exceeded.

3. The method according to claim 1, wherein the feeding of the processed output signal to the neural network occurs also at subsequent points in time.

4. The method according to claim 3, wherein the subsequent points in time occur at equidistant time intervals.

* * * * *